INVENTOR.
FRANK T. COURT, DECEASED
VIRGINIA F. COURT, EXECUTRIX

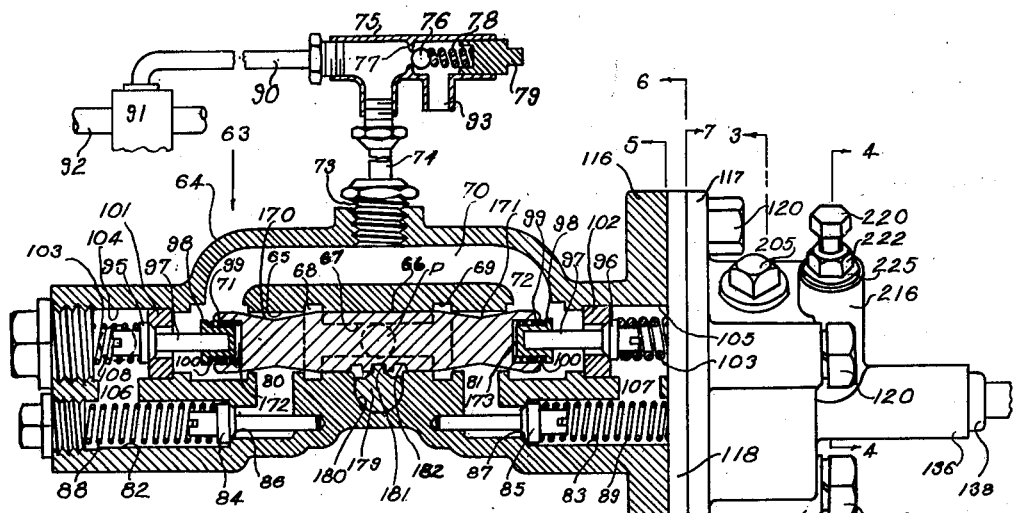
FIG. 2
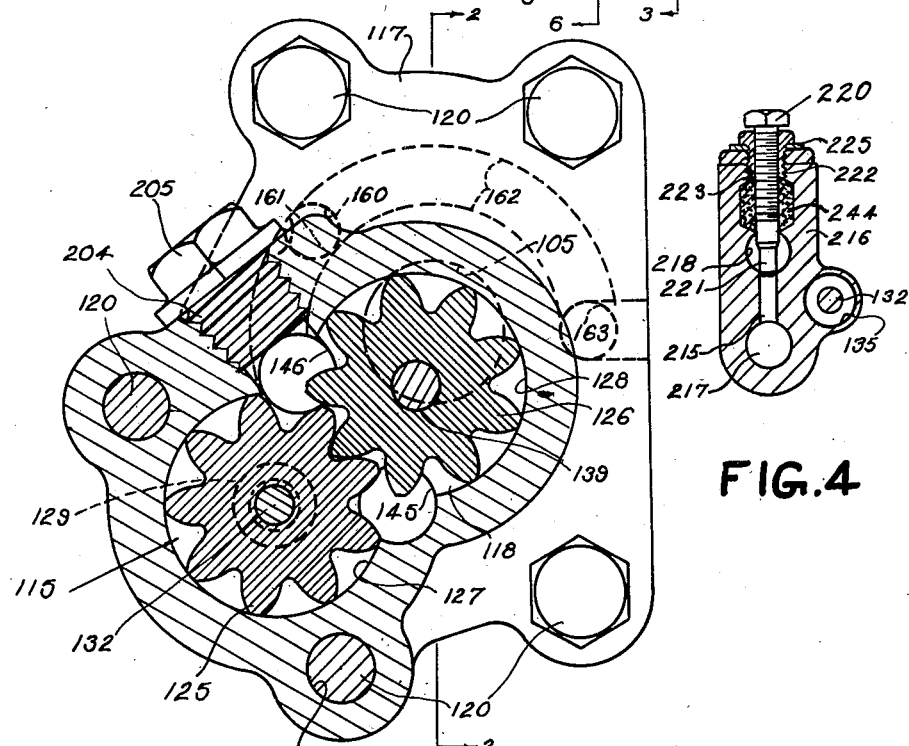
FIG. 3
FIG. 4
INVENTOR.
FRANK T. COURT, DECEASED
VIRGINIA F. COURT, EXECUTRIX Nov. 25, 1952　　　　　F. T. COURT　　　　　2,619,074
CONTROL AND DIVERSION OF EXHAUST PRESSURE
IN HYDRAULIC MECHANISMS
Original Filed Nov. 1, 1944　　　　　　　　　　4 Sheets-Sheet 3

INVENTOR.
FRANK T. COURT, DECEASED
VIRGINIA F. COURT, EXECUTRIX
BY

Nov. 25, 1952  F. T. COURT  2,619,074
CONTROL AND DIVERSION OF EXHAUST PRESSURE
IN HYDRAULIC MECHANISMS
Original Filed Nov. 1, 1944  4 Sheets-Sheet 4
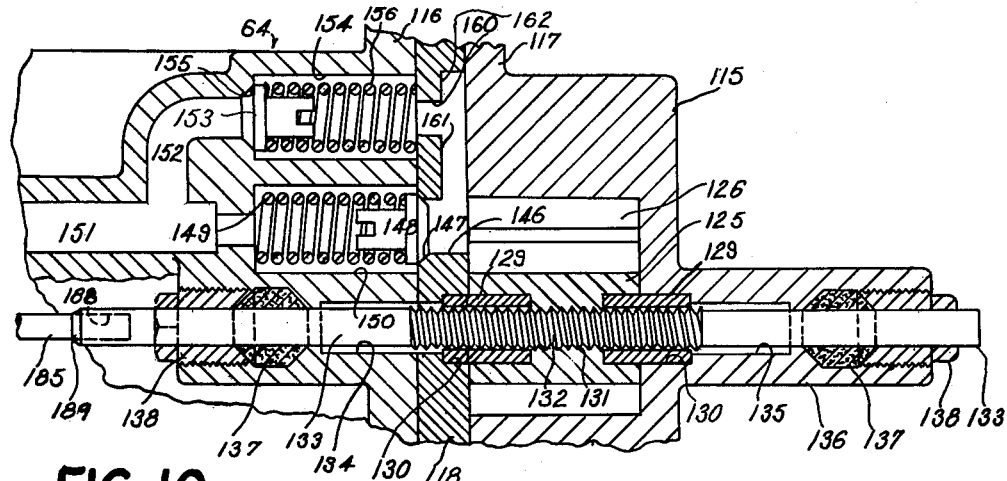
FIG. 10
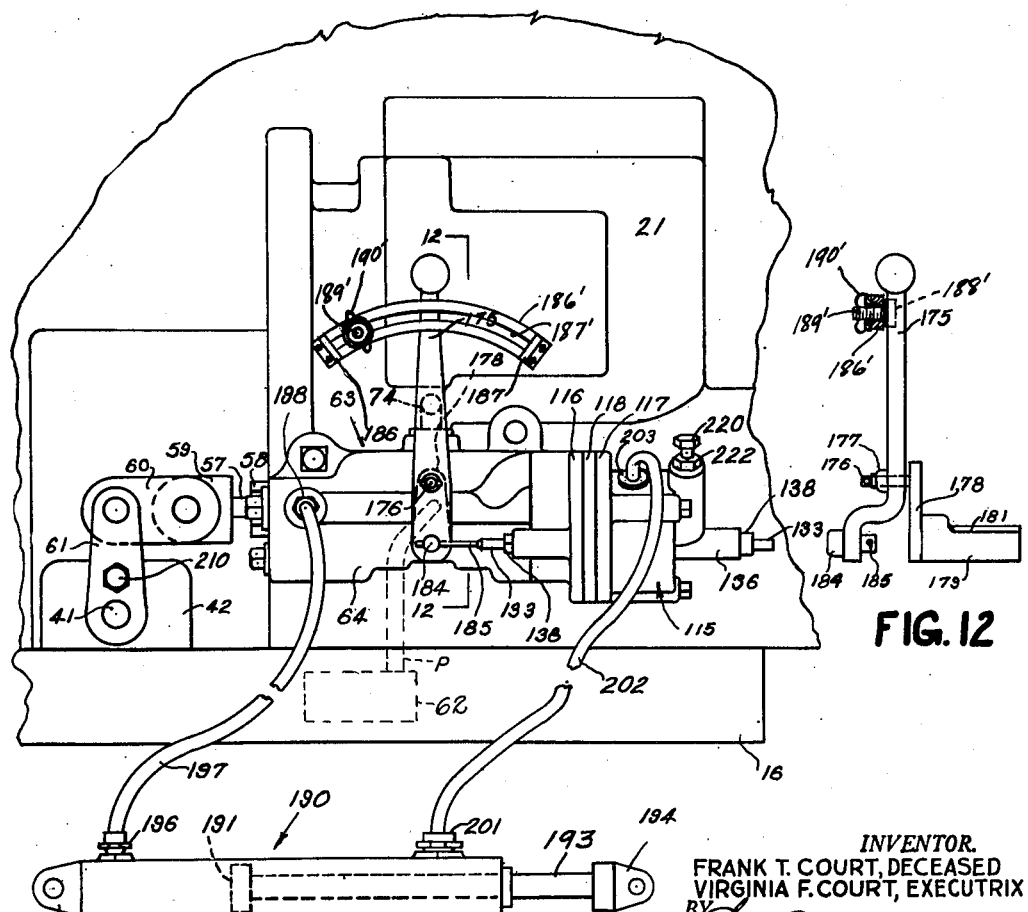
FIG. 11
FIG. 12
INVENTOR.
FRANK T. COURT, DECEASED
VIRGINIA F. COURT, EXECUTRIX
BY

Patented Nov. 25, 1952

2,619,074

UNITED STATES PATENT OFFICE 2,619,074

CONTROL AND DIVERSION OF EXHAUST PRESSURE IN HYDRAULIC MECHANISMS

Frank T. Court, deceased, late of Moline, Ill., by Virginia F. Court, executrix, Moline, Ill., assignor to Deere & Company, Moline, Ill., a corporation of Illinois Original application November 1, 1944, Serial No. 561,433. Divided and this application April 4, 1947, Serial No. 739,496

6 Claims. (Cl. 121—40)

The present invention relates generally to hydraulic power transmitting mechanism and has for its principal object the provision of a novel and improved hydraulic mechanism, which is more sensitively and more accurately controlled than similar mechanism heretofore known to those skilled in the art, and yet which is simple and inexpensive to manufacture. This application is a division of a co-pending application, Serial No. 561,433, filed November 1, 1944, now Patent No. 2,482,249.

Another object of the invention relates to the provision of a hydraulic power transmitting mechanism having a manually adjustable control lever for controlling the movements of the mechanism in either direction, the operation of which is closely similar to that of an ordinary manually controlled lever connected directly to a load.

In the preferred embodiment of the invention, the control lever moves with the load to an extent which is proportional to the extent of movement of the load. The hydraulic motor moves in a direction corresponding to the direction of movement of the control lever by the operator, and it moves the load as long as the operator exerts a pressure upon the control lever but when the lever is released, the motor stops immediately. Thus, the operation of the control lever in a hydraulic mechanism constructed according to the invention, is similar to the movement of an ordinary hand lever connected directly to the load, which moves as long as the operator exerts a pressure against it but stops immediately upon release. The only difference in operation is that the actual force required to move the load is exerted by a separate source of power, rather than by the actual pressure exerted by the operator.

A system of this type is valuable for the purpose of adjusting agricultural implements associated with a tractor, inasmuch as operators of this type of equipment are familiar with the operation of ordinary hand adjusting levers, so that users of a hydraulic mechanism constructed according to the principles of the invention would require practically no additional training in its operation.

Still another object relates to the provision of a novel and improved hydraulic control valve, which provides for a more accurate and positive adjustment of the load by the hydraulic motor. In the operation of a hydraulic power transmitting system, air, oil vapor, and other gases frequently become trapped in the hydraulic circuit, which introduces a certain amount of resiliency in the circuit which prevents the hydraulic motor from holding the load rigidly in adjusted position, but rather allows a certain amount of movement of the load to the extent to which the entrapped air may be compressed. In the accomplishment of this object, the valve is so designed that as the valve is shifted to stop the motor, the return duct from the motor is closed off slightly before the pressure is relieved from the motor, whereby a pressure is built up in the motor duct circuit which is maintained after the motor has stopped and thus holds under considerable pressure any trapped gases, thereby eliminating substantially all of the resiliency within the hydraulic circuit.

These and other objects and advantages of the invention will be apparent to those skilled in the art after a consideration of the following description in which reference is had to the drawings appended hereto, in which Figure 1 is a schematic diagram of the hydraulic circuit;

Figure 2 is a sectional elevational view taken through the valve casing, substantially along a line 2—2 in Figure 3;

Figure 3 is a sectional elevational view taken through the flow meter along the line 3—3 in Figure 2;

Figure 4 is a sectional elevational view taken along the line 4—4 in Figure 2 and showing the proportioning mechanism;

Figure 10 is a fragmentary sectional elevational view taken substantially along the line 10—10 in Figure 5;

Figure 11 is a side elevational view of the valve mechanism, similar to Figure 1 but drawn to an enlarged scale and showing a remotely controlled hydraulic motor connected with the valve mechanism; and Figure 12 is an elevational view of the control lever assembly as viewed along the line 12—12 in Figure 11.

Figure 9:
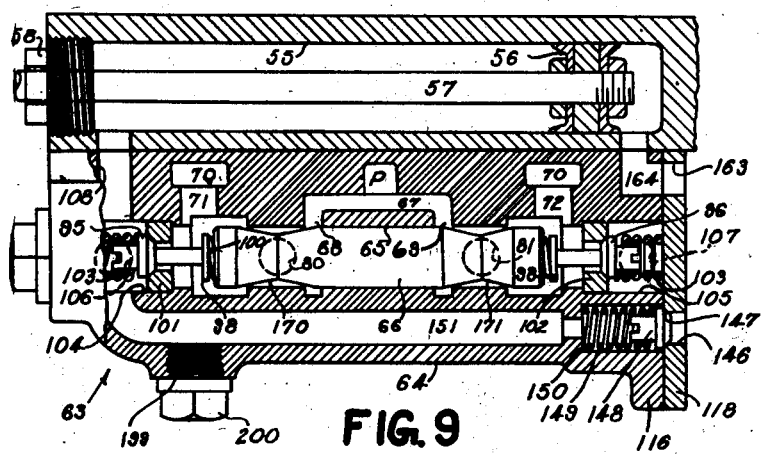
Figure 9 is a plan view taken in section through the valve mechanism, substantially along the line 9—9 in Figure 5 and extended through the hydraulic motor fixed rigidly to the valve casing.

Referring now to the drawings, and particularly to Figure 9, reference numeral 16 indicates the frame of the tractor on which the hydraulic mechanism embodying the present invention is supported. A rockshaft 41 is mounted in a bearing 42 supported on the frame 16 and is adapted to be rocked by power supplied from the tractor engine 21 for the purpose of raising and lowering or otherwise adjusting implements associated with the tractor.

The rockshaft 41 is rotated by means of a hydraulic motor in the form of a hydraulic cylinder 55 (see Figure 9), which is disposed longitudinally of the tractor and rigidly mounted on the side of the tractor engine 21. A piston 56 is slidable axially within the cylinder 55 and is mounted on a piston rod 57 which extends through the end of a cylinder and is slidable within a sealing gland 58 which is threaded into the end of the cylinder 55. The forward end of the piston rod 57 is provided with a fitting 59 which is swingably attached by means of a link 60 to an arm 61 mounted rigidly on the rockshaft 41.

The piston 56 is moved by fluid forced into the cylinder 55 by means of a fluid pump 62 (see Figure 11). The pump 62 can be of any suitable conventional type and therefore need not be described here in detail. Preferably, the pump 62 is disposed in the crankcase of the engine 21 and is driven by a suitable power connection with the latter, and receives oil from the crankcase, and forces the oil upwardly under pressure through a high pressure supply duct P. The flow of oil from the pump to the cylinder 55 is controlled by means of a valve mechanism indicated in its entirety by reference numeral 63 and comprises a valve casing 64 in the form of a casting, through which a cylindrical valve chamber 65 extends longitudinally. Slidably disposed within the valve chamber 65 is a valve member 66, which is cylindrical for the most part and fits closely within the cylinder 65 in order to block any flow of oil therethrough. The fluid pressure supply duct P is connected to an axially extending duct 67 within the casing 64, which registers with a pair of axially spaced ports 68, 69 in the wall of the chamber 65 on opposite sides of the midpoint thereof. Another axially extending passage 70 is connected between a second pair of axially spaced ports 71, 72 in the wall of the valve chamber 65, spaced outwardly from the fluid supply ports 68, 69, respectively. An opening 73 is provided in the top of the casing 64 and is connected by a tube 74 with a valve casing 75 (Figure 2) disposed inside the crankcase of the engine 21. A ball valve 76 is urged against a port 77 within the casing 75, by means of a spring 78 which reacts against a plug 79 threaded into one end of the casing. The other end of the casing 75 is connected to a duct 90, which conducts oil to the various engine bearings, illustrated by a bearing housing 91, in which a shaft 92 is journaled. By this means, the main bearings, connecting rod bearings, cam shaft bearings, and any others can be lubricated by the oil returning from the control valve 63. The spring 78 is sufficient to hold a normal lubricating pressure of approximately 35 pounds per square inch in the duct 90. The surplus oil which escapes through the ball valve port 77 returns to the crankcase through the exhaust 93. The pressure of the spring 78 can be adjusted by screwing the plug 79 in or out, thereby adjusting the pressure maintained in the lubricating supply duct 90.

The valve chamber 65 is provided with a third pair of axially spaced ports 80, 81, which are located between the two pairs of supply and reservoir ports 68, 71 and 69, 72 respectively. The ports 80, 81 communicate with check valve passages 82, 83, within which are disposed check valves 84, 85 which are seated in valve seats 86, 87 and are urged into seated relation within the seats by means of compression springs 88, 89, respectively. The springs 88, 89 are yieldable to permit fluid to flow away from the valve chamber 65 but the check valves 84, 85 prevent flow of oil from the check valve passages 82, 83 into the valve chamber 65.

A pair of check valves 95, 96 are disposed at the ends of the valve member 66 and are provided with valve stems 97 extending inwardly toward the valve member 66. The ends of the valve stems 97 are seated within thimbles 98, which are inserted into sockets 99 in the ends of the valve member 66, respectively. Compression springs 100 encircle the thimbles 98 within the sockets 99 and exert a force outwardly against the thimbles and valve stems 98, 97, and thus serve to center the valve member 66 within the valve chamber 65 as will be seen later.

The check valves 95, 96 are seated within a pair of annular seat members 101, 102, which are fixed in the valve chamber 65 and define the opposite ends thereof, respectively. The check valves 95, 96 are seated in the outer sides of the seat members 101, 102 and have their stems 97 extending through the annular seat members into the valve chamber 65. A pair of compression springs 103 urge the check valves 95, 96 against the seat members 101, 102, which normally close off the ends of the valve chamber 65. The springs 103 are somewhat stronger than the springs 100 and act in opposition thereto to hold the check valves 95, 96 in firm seating relation in the annular seats 101, 102, hence the inner springs 100 are held in compression against the ends of the valve member 66 to center the latter within the chamber 65. The chambers 104, 105 which are disposed in the valve casing on the outer sides of the annular seat members 101, 102, respectively, are connected with the check valve passages 82, 83 by short passages 106, 107, respectively, and the valve chamber 104 is connected by a passage 108 to the forward end of the motor cylinder 55.

A flow meter 115 is mounted on the rear or right end of the valve casing 64, the latter being provided with a vertical extending flange 116 which serves to support a similar vertical flange 117 on the flow meter 115. A connecting plate 118 is disposed between the flanges 116, 117 and is formed with passages for interconnecting certain passages in the valve case 64 and flow meter 115 as will be described. The flanges 116, 117 and the plate 118 are provided with registering bolt holes 119, through which clamping bolts 120 are inserted for the purpose of clamping the flanges and plate rigidly together so that the flow meter 115 and the valve casing 64 form a rigid unitary structure.

The flow meter 115 comprises a pair of intermeshing gears 125, 126 which are disposed within a pair of cylindrical intersecting gear chambers 127, 128, respectively. The gears fit closely within the chambers 127, 128 so that the ends of the teeth are disposed in sliding contact with the cylindrical walls of the chambers. The gear 125 is journaled on a pair of axially spaced bearing sleeves 129, best shown in Figure 10, the sleeves 129 being pressed into sockets 130 in the plate 118 and in the flow meter 115, respectively. Between the two bearing sleeves 129 the gear 125 is provided with an axially extending threaded aperture 131 (Figure 10), which is adapted to engage an axially extending threaded rod 132, which is slidable within the sleeves 129 and engages the threads in the gear aperture 131. The engagement of these threads is rather loose, so that the thrust of the gear 125 is carried entirely by the sleeves 129, while rotation of the gear 125 causes the threaded rod 132 to shift axially through the sleeves 129. The ends 133 of the rod 132 are slightly smaller in diameter than the threaded portion of the rod, and extend forwardly through a passage 134 in the valve case 64 and rearwardly through a passage 135 in a tubular extension 136 of the flow meter 115, respectively. Packing glands 137 are provided embracing the ends 133 of the rod to prevent loss of oil from the rod passages 134, 135, and the glands 137 are securely held in place by bushings 138.

The other gear 126 is mounted on a short shaft 139, one end of which is journaled in a socket 140 (see Figure 6), in the plate 118, and the other end of which is journaled in a similar socket (not shown) in the flow meter casing 115. The gear chambers 127, 128 are open at their inner ends and abut against the face of the plate 118.

The plate 118 is provided with an aperture 145 which registers with the check valve passage 83 and thereby connects the latter in communication with the gear chambers 127, 128 adjacent one side of the intermeshing teeth of the gears 125, 126. An aperture 146 is provided in the plate 118 communicating with the gear chambers 127, 128 on the opposite side of the intermeshing teeth from the aperture 145. The left side of the plate 118 is provided with a valve seat 147 around the edge of the aperture 146 and receives a check valve 148, which is urged in seated position by means of a strong compression spring 149 within a check valve chamber 150 formed in the valve casing 64. The check valve 148 is an excess pressure relief valve and therefore the spring 149 is strong enough to hold the valve 148 closed against normal working pressures in the system. The excess pressure valve chamber 150 is connected to a longitudinally extending duct 151 in the casing 64, which connects with the check valve chamber 104 at the forward end of the valve casing 64, as best shown in Figure 9.

Figures 5, 6, 8:
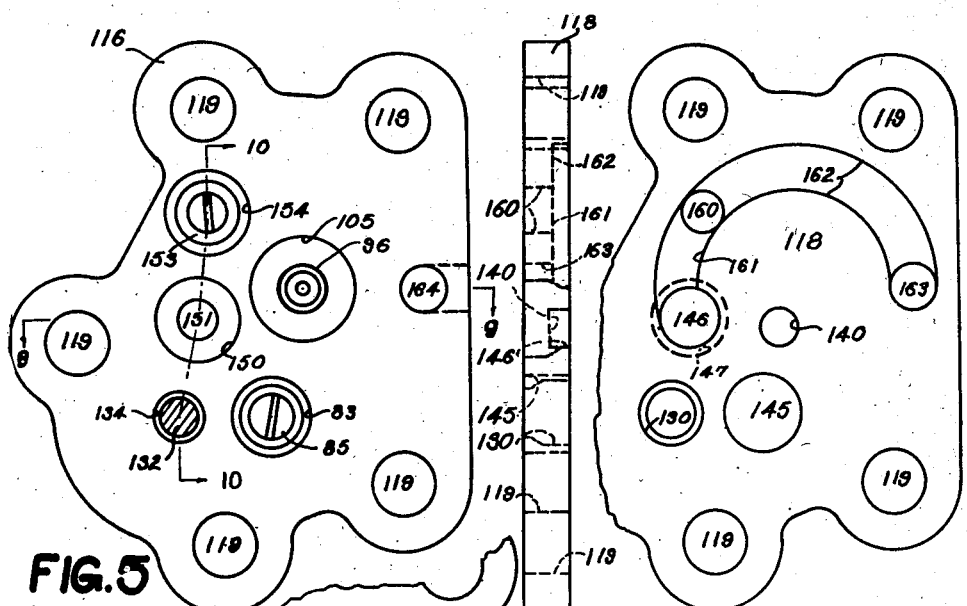
Figure 5 is an end view of the valve casing as viewed along the line 5—5 in Figure 2.
Figure 6 is an elevational view of an apertured plate interposed between the valve case and the flow meter, as viewed from the meter side of the plate indicated by the line 6—6 in Figure 2.
Figure 8 is an elevational view of the edge of the plate.
Figure 7:
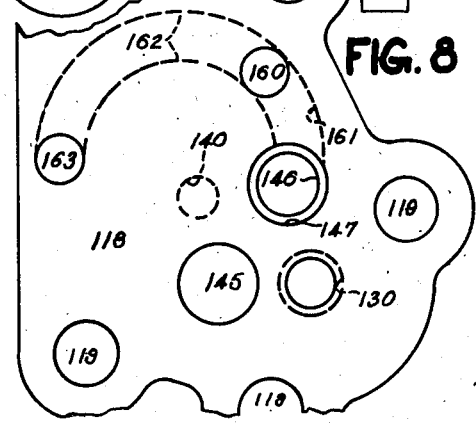
Figure 7 is an elevational view of the valve case side of the plate as viewed along the line 7—7 in Figure 2.

A branch 152 of the duct 151 extends to a second excess pressure relief valve 153 which is disposed within a valve chamber 154 in the valve casing 64, best shown in Figure 10. The check valve 153 is seated in a seat 155 and is yieldably held in seated relation by a strong compression spring 156, which holds the valve 153 closed against normal operating pressures within the connecting duct 151 but yields to an excess pressure within that duct. The opposite end of the valve chamber 154 is disposed in register with an aperture 160 in the plate 118. The apertures 146, 160 are interconnected by means of a groove 161 in the plate 118, the depth of which is substantially one-half that of the thickness of the plate, as best shown in Figure 8. The groove is formed in the side of the plate adjacent the flow meter 115 and is covered by the flange 117 of the flow meter. A continuation 162 of the groove 161 extends in an arc about the axis of the valve chamber 105, as best shown in Figure 3. The end of the groove 162 communicates with an aperture 163 in the plate 118, which is disposed in register with a passage 164 in the valve casing 64, which passage leads to the rear end of the cylinder 55, as best shown in Figure 9.

Figure 1:
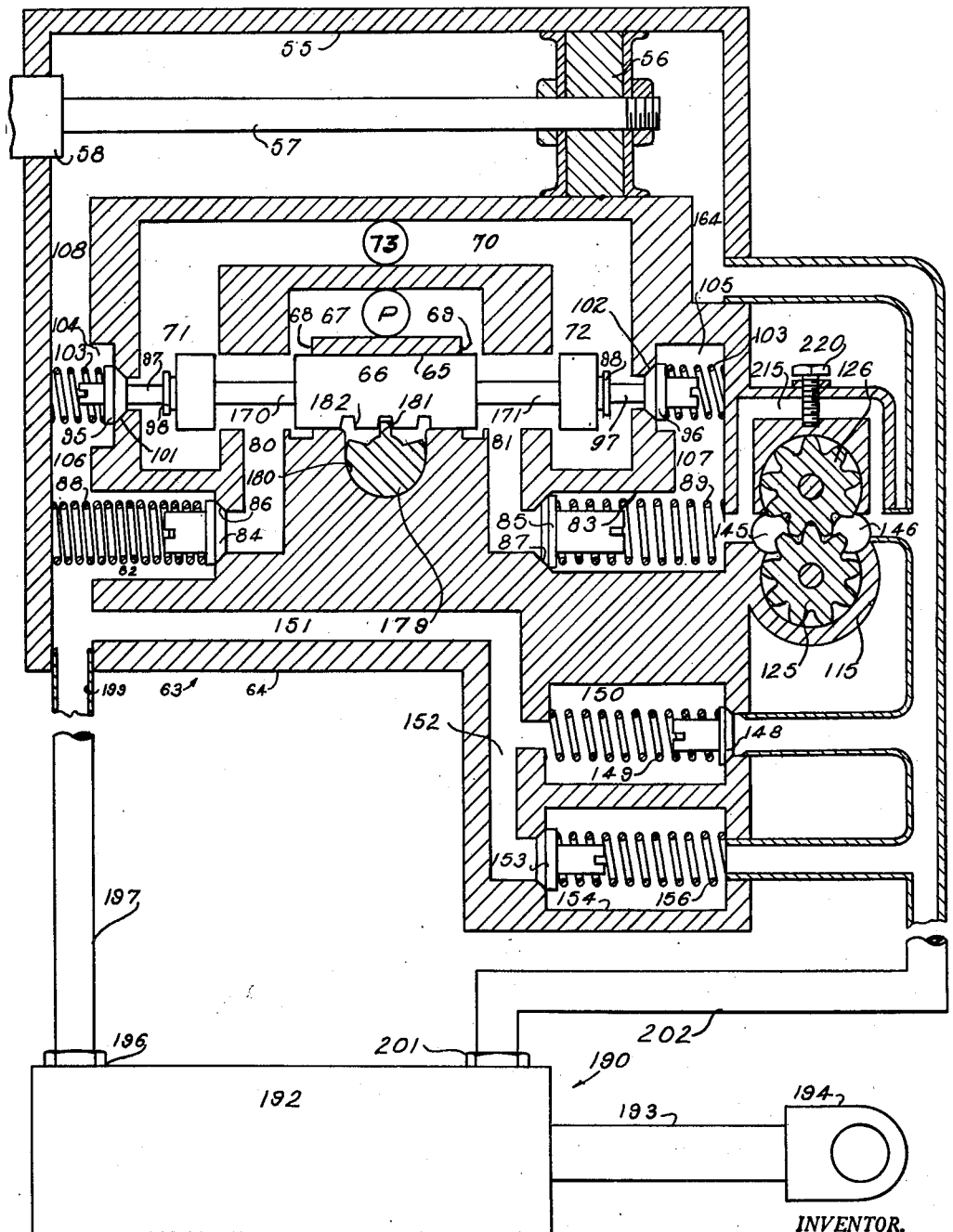

The valve member 66 is shown in the drawings in its neutral position. It is provided with a pair of axially spaced zones or sections 170, 171 of reduced diameter, which are actually tapered, as shown in Figures 2 and 9, but are exaggerated in the schematic diagram of Figure 1 for the sake of clearness. In the neutral position of the valve member 66, the portions of reduced diameter 170, 171 bridge across and interconnect the supply ports 68, 69 and the adjacent reservoir ports 71, 72, respectively. This causes the oil to flow from the supply duct P through the two supply ports 68, 69 along the reduced portions 170, 171 of the valve member 66 and through the ports 71, 72 and ducts 70, 74 into the lubricating supply duct 90. Any surplus oil beyond that required for lubrication, escapes through the ball valve port 77 into the reservoir through the exhaust 93. The oil is locked in both ends of the cylinder 55 to hold the piston 56 against movement therein, by means of the check valves 84, 85, 95, 96, all of which are held in closed position by their respective compression springs 88, 89 and 103. This locks the rockshaft 41 against movement and thereby holds the implement in fixed position except for such flexibility as is provided by the link connections, as explained in my co-pending application mentioned above.

The implement is raised by shifting the valve member 66 toward the left, by means which will be described later. Shifting the valve member 66 to the left closes the supply port 68 and also closes the reservoir port 72 from communication with the check valve port 81 and also acts through the stem 97 to open the check valve 95. The oil now flows from the pump duct P through the port 69, around the reduced portion 171 of the valve member 66, into the check valve port 81, forcing the check valve 85 open, against the pressure of the spring 89. The oil flows through the check valve passage 83, and since the check valve 96 is held closed by the spring 130, the oil flows through the aperture 145 in the plate 118 into the flow meter. The oil pressure rotates the flow meter gears, turning the gear 125 in a clockwise direction, as viewed in Figure 3, the other gear 126 turning in a counterclockwise direction, carrying the oil between the gear teeth and the gear chambers 127, 128 and discharging the oil through the aperture 146 in the plate 118. The oil then flows through the groove 161, 162 and through the aperture 163 in the plate and the passage 164 in the valve casing into the rear end of the cylinder 55, the pressure of the oil forcing the piston 56 forwardly or to the left as viewed in the drawings. With normal loads on the piston rod 57, the oil pressure is insufficient to force the check valve 148 open and therefore no oil flows into the duct 151.

As the piston 56 moves toward the left, the oil in the forward end of the cylinder 55 is forced by the piston through the passage 108 into the valve chamber 104. The check valve 84 is at this time closed, but as mentioned above, the check valve 95 is held open by the valve member 66 and therefore the oil flows through the annular seat 101 into the valve chamber 65 and through the reservoir port 71 and ducts 70, 74, into the lubricating duct 90 and through the ball valve port 77 to the reservoir. The piston 56 can be stopped at any point by returning the valve member 66 to the neutral position, thereby closing the exhaust check valve 95 and reestablishing the circulation of oil from the supply ports 68, 69 to the reservoir ports 71, 72.

The piston 56 can then be shifted toward the right or rear end of the cylinder 55 to lower the load by shifting the valve member 66 toward the right, closing off the supply port 69 and blocking communication between the reservoir port 71 and the check valve port 80, and at the same time acting through the valve stem 97 to open the check valve 96. The oil now flows through the supply port 68 around the reduced portion 170 of the valve member 66, through the passage 80, forcing open the check valve 84, and thereby allowing the oil to flow through the opening 106 and through the check valve chamber 104 into the forward end of the cylinder 55 through the passage 108. Movement of the piston 56 toward the right forces the oil from the right end of the cylinder 55 through the passage 164 and aperture 163, around the grooves 162, 161 into the flow meter through the aperture 146. The oil leaves the flow meter through the aperture 145 in the plate 118 and flows into the check valve passage 83, but since the check valve 85 is closed by the pressure of the oil, the latter flows through the aperture 107 into the check valve chamber 105. As mentioned above, the exhaust valve 96 is open, permitting the oil to flow into the reservoir port 72 and through the ducts 70, 74 and ball valve 77 back to the reservoir. Again, the piston 56 can be stopped at any point in its range by returning the valve member 66 to neutral position, thereby establishing a circulation of oil from the supply ports 68, 69 to the reservoir ports 71, 72, while the check valves 84, 85, 95, 96 are all closed by their respective springs and by the pressure of oil within the cylinder.

It should be noted that there is no discontinuity in the flow of oil to the bearings 91 through the supply duct 90. Whenever the lift cylinder is stationary, the entire output of the pump 62 flows directly through the control valve 63 to the supply duct 90, and when this direct supply of oil is cut off by the valve member 66 and applied under full lifting pressure to either end of the cylinder 55, the oil from the other end of the latter flows to the lubricating supply duct 90 and is maintained at the comparatively low pressure required for lubrication by the ball valve. Hence, there is never a time when the bearings are deprived of oil under constant pressure of appropriate value.

Although oil is an incompressible fluid, it frequently occurs that air or oil vapor accumulates in such quantities that even with the check valves closed, the piston 56 is not held rigidly in adjusted position, since it can be reciprocated back and forth to the extent permitted by the compression and expansion of the trapped gases or air within the cylinder or connecting ducts. This difficulty is overcome, however, according to the principles of the invention, by the provision of a small amount of clearance between the check valve thimbles 98 and the ends of the sockets 99 in the valve member 66. By virtue of this clearance, indicated by reference numerals 172, 173 in Figure 2, the valve member does not engage either of the thimbles 98 until after it is shifted far enough to cut off communication between the reservoir port 71 (or 72) and the check valve port 101 (or 102) at the opposite end of the valve. The result of this provision is that pressure is established on one side of the piston 56 slightly before the exhaust valve on the other side of the piston is opened. Conversely, when the valve member 66 is shifted back to neutral position, the exhaust check valve is allowed to close slightly before the pressure is relieved from the other end of the cylinder. This causes the air in the cylinder, if any, to be maintained in a compressed state at all times, thereby minimizing the amount of lost motion in the piston 56 when the valve member 66 is in neutral position, with the result that for practical purposes, the piston 56 is locked rigidly in its adjusted position in the cylinder 55.

For example, when the valve member 66 is shifted toward the left to effect an adjustment of the piston 56 toward the left, the valve member compresses the spring 99 associated with the exhaust valve 95, but does not move the latter, since the spring 103 which holds the valve 95 is stronger than the spring 99. The clearance 172 is sufficient that the reservoir port 72 is cut off by the valve member 66 from communication with the port 81 and the supply port 68 is also blocked by the valve member 66, causing oil pressure to be applied through the check valve 85 to the rear end of the cylinder 55, while the check valve 95 at the opposite end is still closed. Thus, the pressure builds up in both ends of the cylinder 55, compressing any gases or air that may be there. A very slight further movement of the valve member 66 causes the latter to engage the thimble 98 of the check valve 95 and open the latter, relieving pressure from the forward end of the cylinder 55 and permitting the piston 56 to move forwardly therein. Conversely, when the valve member 66 is returned to neutral position, it disengages the thimble 98 of the exhaust check valve 95, closing the latter slightly before the reservoir port 72 is opened into communication with the supply port 69, whereupon a high compression is established within the cylinder 55 immediately before the valve member 66 is neutralized, thereby locking the piston 56 rigidly in adjusted position.

As stated above, the valve member 66 is maintained in a central position by the opposed springs 99 at opposite ends thereof.

In case the operator does not release the valve member 66 and permit it to move to neutral position to stop the piston 56 before it arrives at the end of the cylinder 55, or in the event that the load on the rockshaft approaches the maximum safe value, the oil pressure on one side of the piston 56 rises to a value sufficient to open the associated excess pressure relief valve 148 or 153. For example, should the piston 56 reach the forward end of the cylinder, the pressure in the rear end of the cylinder rises until the check valve 148 is forced open, permitting the oil to flow through the passage 151 into the valve chamber 104 and past the exhaust valve 95, which is held open by the valve member 66, into the reservoir port 71. Conversely, should the piston 56 reach the rear end of the cylinder 55, the pressure in the forward end of the cylinder rises, acting through the oil in the duct 151 to force open the check valve 153, thereby establishing a flow through the valve chamber 154, the aperture 160 in the plate 118, through the groove 161 and through the flow meter 115 into the valve chamber 83 through the aperture 145 in the plate, and from there through the exhaust valve 96 into the reservoir port 72.

The valve member 66 is shifted by means of a manually adjustable control lever 175, swingably mounted on a pivot pin 176, the lever 175 being provided with a supporting hub 177 that is journaled on the pin 176. The pivot pin is supported on an arm 178, which is fixed to a shaft 179, journaled in a hemi-cylindrical recess 180 in the valve casing 64, intersecting the valve chamber 65 beneath and substantially perpendicular thereto. The shaft 179 is formed with a pair of axially extending splines spaced apart to form a pinion tooth 181, which meshes with one of a plurality of notches 182 cut transversely in the bottom of the valve member 66. The lever extends downwardly beneath the pivot pin 176 and receives a pin 184, which is rigidly connected to a short length of flexible cable 185, the other end of which is fixed, as by soldering at 188, within a socket 189 in the forward end 133 of the threaded rod 132, as best shown in Figures 10 and 11. The cable 185 is provided with a limited amount of flexibility in bending, but is substantially rigid against twisting. A piece of piano wire can be substituted for the cable 185 if desired.

Thus, by swinging the lever 175 about the pivot pin 184 as a fulcrum, the shaft 179 is rocked through the arm 178, to rock the pinion tooth 181 and thus shift the valve member 66 in either direction from the neutral position. Swinging the lever forwardly or to the left, rocks the toothed shaft 179 in a counterclockwise direction which shifts the valve member 66 toward the left which, as explained above, causes a movement of the piston 56 toward the forward or left end of the cylinder 55. Similarly, by swinging the lever 175 to the right, the piston 56 moves rearwardly in the cylinder 55, thereby rocking the main rockshaft 41 in a clockwise direction. As the piston 56 moves in the cylinder 55, the oil flows through the flow meter, rotating the gear 125 on its supporting sleeves 129, causing the threaded portion 131 to cooperate with the threaded rod 132 to shift the latter in the direction opposite to the movement of the piston 56, thereby causing the lever 175 to swing about the pivot pin 176 with the handle of the lever moving in the same direction as the piston 56 and at a speed substantially proportional to the speed of the piston 56. For example, when the lever 175 is shifted forwardly about the pivot 184, the valve member 66 is shifted forwardly, causing oil to flow through the check valve 85 and through the flow meter from the aperture 145 to the aperture 146 in the plate 118, into the right end of the cylinder 55, thereby pushing the piston 56 forwardly or to the left. Rotation of the flow meter gear 125 causes the threaded rod 132 to shift toward the right, exerting a pull through the cable 185 on the lower pivot pin 184, thereby causing the lever 175 to swing in a counterclockwise direction as the piston 56 moves forwardly.

It will be evident, therefore, that inasmuch as the volume of oil pumped into the cylinder is directly proportional to the movement of the piston therein and the volume of oil is proportional to the number of revolutions of the meter gear 125, it follows that the axial movement of the rod 133 is directly proportional to the movement of the piston 56 in the cylinder 55. Hence, the position of the rod 133 and lever 175 controlled thereby is an indication of the position of the piston.

The piston 56 can be stopped in any position of adjustment by releasing the lever 175, which retracts slightly in a clockwise direction as the valve member 66 is centered, but the position of the lever 175 provides a visual indication of the position of the piston 56 within the cylinder. When the operator swings the lever 175 rearwardly or to the right as viewed in the drawings, the valve member 66 is shifted toward the right, causing a pressure to build up in the forward end of the cylinder 55 while the oil in the rear end of the cylinder is discharged through the passage 164 and through the flow meter, but this time in a reverse direction from the aperture 146 to the aperture 145 in the plate 118, thereby turning the gear 125 in the reverse direction and shifting the threaded rod 132 toward the left, thereby shifting the lever 175 by pushing through the cable 185 against the pin 184 and swinging the lever about the upper pivot 176, at a speed which is substantially proportional to the speed of travel of the piston 56 rearwardly in the cylinder 55. The pitch of the threads on the rod 132 and gear 125 are such that the lever 175 travels through a predetermined angular range as the piston 56 moves from one end of the cylinder 55 to the other. The extent of this range of movement of the lever 175 is limited by permanent stops 186, 187 (see Figure 11) in the form of brackets on the side of the engine 21, and which support an arcuate guide member 186' having an arcuate slot 187'. An adjustable stop 188' is provided with a threaded stud 189' slidable within the slot 187'. A thumb nut 190' threads on the stud and secures the stop in adjusted position. The adjustable stop 188' can be set on the guide 186' to stop the control lever 175 at any point in its range for the purpose of determining the operating position of the plow or other implement. It will be noted, however, that the lever 175 can be moved past the stop 188' by bending the lever slightly inwardly, to permit the implement to be adjusted beyond the predetermined operating position, or to synchronize the lever with the piston as will be explained later.

In the event that an excess load is imposed upon the rockshaft 41, raising the pressure in the cylinder above the pressure for which the relief check valves 148, 153 are set, one of the latter will be forced open, depending upon the direction of travel of the piston 56, thereby bypassing the cylinder 55 through the by-pass duct 151. Therefore, since the oil continues to flow through the flow member 115, the lever 175 continues to move until it encounters the appropriate one of the two stops 186, 187, after which the threaded rod 132 swings the lever about the stop as a fulcrum to return the valve member 66 to neutral position. Thus it is evident that even though the operator holds the control lever 175 in an active position after the load has increased above the permissible maximum value, the valve is automatically shut off after the short period of time required to shift the threaded rod 132 to the end of its stroke, after which no further movement of the valve member 66 can be made in that direction, although it can be shifted in to opposite direction to back the piston away from the obstruction which has caused the excess pressure.

At that time, however, the control lever 175 is out of timing with respect to the piston 56, for the control lever is at the end of its stroke while the piston 56 is at an intermediate position depending upon where the obstruction was encountered. The lever 175 can easily be resynchronized with the piston 56, however, by swinging it in the opposite direction to shift the piston away from the load and holding it in the said opposite direction after the piston 56 strikes the end of the cylinder 55, until the lever has been shifted by the threaded rod 132 up against the opposite stop on the casing 64, thereby causing the valve member 66 to be returned to neutral position. Now the piston 56 and the control lever 175 are both at the end of their range of movement in that direction and are therefore back in timed relation.

Although the operation of the hydraulic mechanism has been disclosed with the flow meter, in connection with the built-in cylinder 55, it will be evident to those skilled in the art that the flow meter could be replaced by a simple direct mechanical connection from the lower pivot pin 184 to the rockshaft 41. However, the flow meter 115 is an essential part of the system when the system is used in connection with a remote hydraulic motor 190 in the form of a piston 191 slidable axially within a cylinder 192. The piston 191 is mounted on a connecting rod 193 which is provided with a suitable clevis 194 for the purpose of connecting the piston to a load, while the cylinder 192 is provided with a mounting bracket 195, by which the cylinder can be anchored to a suitable support, either on the tractor 15 or on an implement frame which is connected to be drawn by the tractor 15. The forward end of the cylinder 192 is connected through a suitable fitting 196 to a flexible hose 197, the opposite end of which is connected through a fitting 198 (see Figure 11) to an aperture 199 (see Figure 9) in the side of the case 64 and communicating with the passage 151. When only the built-in cylinder 55 is used, the aperture 199 is tightly closed by means of a suitable plug 200.

The rear end of the cylinder 192 is connected through a suitable fitting 201 to a flexible hose 202, the opposite end of which is connected through a fitting 203 to an aperture 204 (Figure 3) in the side of the flow meter case 115, communicating with the aperture 146 in the plate 118. The aperture 204 is tightly closed by a plug 205 (Figure 2), when the remote cylinder 192 is not connected in the circuit.

When it is desired to use only the fluid motor 190, the piston 56 is blocked rigidly within the cylinder 55, preferably by means of a bolt 210 (see Figure 11), which rigidly fixes the arm 61 to a bearing casting 42. Thus, although pressure builds up within the cylinder 55, there is no movement of the piston 56 therein, permitting full pressure to be applied to the piston 191 in the cylinder 192.

It will be evident that if the remote cylinder 192 has the same piston displacement as the built-in cylinder 55, the range of movement of the control lever 175 is the same for either cylinder when used alone. That is to say, the movement of the lever 175 will be substantially proportional in speed to the movement of the piston 191 in the cylinder 192 and the position of the control lever 175 will be a visual indication at all times of the position of the piston 191 within the cylinder.

However, it is desirable at times to use a remote cylinder 192 which is larger than the built-in cylinder 55, or it may be desirable to connect the remote cylinder 192 in parallel with the cylinder 55 and control them simultaneously. Without further provision, however, this would not be practicable, for the control lever 175 would engage the stops 186, 187 long before the parallel connected cylinders 55, 192 had reached the end of their range, for the flow meter 115 moves the lever 175 a distance proportional to the quantity of oil that has flowed through the gears, and obviously the two parallel connected cylinders would require considerable more oil than would one of them alone. The same would be true if a larger cylinder were used at the remote position. Of course, it is possible to remove the stops 186, 187 and permit the lever 175 to have a longer range of travel when there is more oil to pump, but such longer range of travel might be too long to be convenient, for it might swing the control lever 175 out of reach of the operator, not to mention the necessity for making the threaded rod 132 long enough and the connections from the rod to the lever proper for the longer range of movement.

To obviate these difficulties, provision is made for by-passing a certain proportion of the oil, with an adjustment provided in the by-pass so that only the amount of oil corresponding to the capacity of the built-in cylinder 55 is passed through the flow meter 115, while the remainder of the oil is by-passed around the flow meter. This is accomplished by providing a short by-pass duct 215 (see Figure 4), interconnecting the two sides of the gear chambers across the intermeshing teeth of the gears 125, 126. The interconnecting passage 215 is provided within an enlarged portion 216 of the flow meter housing 115, with a pair of passages 217, 218 at opposite ends of the interconnected passage 215, respectively, disposed in alignment with the apertures 145, 146 in the plate 118, respectively. A threaded bolt member 220 is disposed in coaxial alignment with the by-pass duct 215, the inner end of which serves as a plug 221, which can be inserted into the by-pass duct 215 to completely close the same, or can be backed away from the end of the duct 215 to permit a limited flow of oil therethrough. The bolt member 220 is supported in a bushing 222, which is threaded into an aperture 223 in the upper end of the enlarged housing portion 216 and a gland 224 is provided for sealing the bolt member 220 against leakage of oil. A sealing washer 225 is provided under the head of the bushing 222.

When the remote cylinder 192 is of the same capacity as the built-in cylinder 55, and the remote cylinder is to be used alone, the bolt member 220 can be screwed in until the inner end 221 blocks the interconnecting duct 215. However, when a remote cylinder 192 of larger capacity is installed, the bolt member 220 is backed outwardly to open the by-pass duct 215 slightly to permit a portion of the fluid flow to be by-passed through the by-pass 215. The lever 175 is then actuated until it comes up against one of the stops 186, 187 but if it engages the stop before the cylinder has reached the end of its travel, that is an indication that more oil should be by-passed and therefore the bolt member 220 is backed off still farther to move the end 221 farther from the end of the by-pass 215. Conversely, if the hydraulic motor 192 travels over its range before the lever 175 engages the stop, the plug 221 should be moved closer to the end of the by-pass 215. In this manner, the flow of oil through the meter and the by-pass can be proportioned so that the lever 175 and the piston 191 travel over their ranges in the same length of time. In the event that the lever 175 and piston 191 get out of synchronism with each other, they can be resynchronized by the same method described above in connection with the built-in cylinder 55.

It is not intended that the invention be limited to the exact details shown and described herein, except as set forth in the claims which follow.

What is claimed as the invention of said Frank T. Court, deceased, and desired to be secured by Letters Patent, is:

1. For use in hydraulic mechanism including a cylinder, a piston movable therein, and duct means connected with both ends of said cylinder, respectively, a valve for controlling the flow of fluid through said duct means, said valve comprising a casing having a cylindrical valve chamber having a pair of axially spaced ports connected in communication with said cylinder ducts, respectively, a check valve in each of said ducts providing for fluid flow into said ducts through said ports but restraining reverse flow therethrough, said chamber having supply and exhaust ports therein, a valve member slidable axially in opposite directions within said cylinder from a neutral position, in which said supply and exhaust ports are interconnected, in one direction to connect said supply port with one of said cylinder duct ports and in the other direction to connect said supply port with the other of said cylinder duct ports, a pair of exhaust valves at the ends of said valve chamber engageable by said valve member when the latter is shifted axially to admit fluid to either of said cylinder ducts and to connect the other cylinder duct with said exhaust port, there being sufficient lost motion between said valve member and each of said exhaust valves so that, as said valve member is returned to neutral position from either direction, it disengages the exhaust valve to close the latter slightly before the supply pressure is relieved from the opposite end of said cylinder, whereby said piston is locked rigidly in said cylinder in adjusted position.

2. For use in hydraulic mechanism including a cylinder, a piston movable therein, and duct means connected with both ends of said cylinder, respectively, valve mechanism for selectively directing fluid under pressure into either end of said cylinder and exhausting fluid from the other end, said valve mechanism comprising a valve casing having a cylindrical valve chamber and a valve member slidable axially therein, means for connecting said cylinder ducts with said chamber, a pair of exhaust valves of the poppet type positioned in said casing to control said cylinder ducts and biased to close the latter, said exhaust valves being engageable by said valve member to open the same at opposite ends of the range of movement of said valve member, respectively, said chamber having a port through which fluid is supplied under pressure and other ports through which fluid is discharged from said valve casing, said valve member being shiftable in either direction, selectively, from a central neutral position to an active position near the end of said chamber in which one end of said cylinder is connected through its respective duct means with said supply port, and said valve member being engaged with said exhaust valve associated with the other end of said cylinder to exhaust the same, there being sufficient clearance between said valve member and said exhaust valves in said neutral position whereby said exhaust valves are disengaged to close the exhausting end of said cylinder slightly before the fluid pressure from the supply port is cut off by the valve member from the other end of the cylinder as the valve member is returned to said neutral position.

3. The combination set forth in claim 2 including the further provision of opposed resilient means between each end of said valve member and the adjacent exhaust valve biased to urge said valve member toward said neutral position.

4. In hydraulic mechanism, a control valve device comprising a casing having a cylindrical valve chamber provided with supply and exhaust ports, a valve member shiftable in said chamber from a central neutral position in either direction to vary fluid-transfer relationship between said supply and exhaust ports, a cylinder duct port in each end of said chamber, poppet type check valves in said cylinder duct ports, respectively, and spring means urging said check valves toward closed position, said valve member being engageable with one of said check valves when said member is shifted in either direction, respectively, there being clearance between each of said check valve and said shiftable valve member when the latter is disposed in said central neutral position so that said valve member is shiftable axially to a limited extent in either direction to vary the fluid-transfer relationship between said supply and exhaust ports prior to engagement of said valve member with either check valve.

5. In hydraulic mechanism, a control valve device comprising a casing having a cylindrical valve chamber provided with supply and exhaust ports, a valve member shiftable in said chamber from a central neutral position in either direction, a cylinder duct port in each end of said chamber, poppet type check valves in said cylinder duct ports, respectively, spring means between said casing and each of said check valves urging the latter toward closed position, said valve member being engageable with said check valve when said member is shifted in either direction, respectively, there being clearance between each of said check valves and said shiftable valve member when the latter is disposed in said central neutral position, and resilient means disposed between each of said check valves and said shiftable valve member urging the latter toward said neutral position.

6. For use in a fluid pressure system including a two-way motor having a fluid chamber and a motor member movable in either of opposite directions therein, and a pair of duct means connected to the chamber respectively at opposite sides of the motor member: a valve assembly, comprising a casing having an elongated cylindrical valve chamber therein; an elongated cylindrical valve member selectively shiftable axially in the valve chamber from a central neutral position to either of two active positions spaced axially at opposite sides of the neutral position; supply duct means in the casing communicating with the valve chamber intermediate the ends thereof and intermediate the ends of the valve member; reservoir duct means in the casing communicating with the valve cylinder via a pair of reservoir ports spaced axially of the valve chamber, one at each side of the supply duct means and within the length of the valve member; a pair of fluid-transfer means in the casing connectible respectively to the motor duct means for effecting fluid transfer alternately to and from opposite sides of the motor chamber and including a pair of motor ports spaced apart axially of the valve chamber, one at each side of the supply duct means and communicating with said valve chamber within the length of the valve member, said fluid-transfer means further including a pair of check valve means biased to closed positions respectively between the motor duct means and the reservoir means and biased to prevent return of fluid from the motor, each check valve means having an operating element projecting into the path of movement of the valve member; and said valve member, check valve operating elements, ports and supply duct means being constructed and arranged so that when the valve member is in its neutral position the supply duct means and reservoir ports are in communication and both check valve means are closed, and so that when the valve member is in either active position the supply duct means is cut off from the reservoir means and connected to one fluid-transfer means and the check valve means of the other fluid-transfer means is opened by the valve member to communicate the associated motor port with the reservoir means.

VIRGINIA F. COURT,
*Executrix of the Estate of Frank T. Court, Deceased.*

REFERENCES CITED

The following references are of record in the file of this patent:

UNITED STATES PATENTS

| Number | Name | Date |
|---|---|---|
| 458,191 | Ripley | Aug. 25, 1891 |
| 486,095 | Elmes | Nov. 15, 1892 |
| 913,853 | Rowntree | Mar. 2, 1909 |
| 994,544 | Sutter | June 6, 1911 |
| 1,775,856 | Hauser | Sept. 16, 1930 |
| 1,897,386 | Ferris | Feb. 14, 1933 |
| 2,004,638 | Smith | June 11, 1935 |
| 2,050,421 | Charles | Aug. 11, 1936 |
| 2,165,001 | Meyer | July 4, 1939 |
| 2,185,277 | Stelzer | Jan. 2, 1940 |
| 2,304,380 | Shaeffler | Dec. 8, 1942 |
| 2,337,638 | Brown | Dec. 28, 1943 |
| 2,342,770 | Temple | Feb. 29, 1944 |